(12) United States Patent
Hamano et al.

(10) Patent No.: US 12,475,750 B2
(45) Date of Patent: Nov. 18, 2025

(54) INFORMATION COLLECTION SYSTEM AND INFORMATION COLLECTION METHOD

(71) Applicant: HONDA MOTOR CO., LTD., Tokyo (JP)

(72) Inventors: Rui Hamano, Tokyo (JP); Keisuke Umehara, Tokyo (JP); Daiki Nogami, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 161 days.

(21) Appl. No.: 18/467,410

(22) Filed: Sep. 14, 2023

(65) Prior Publication Data

US 2024/0104981 A1    Mar. 28, 2024

(30) Foreign Application Priority Data

Sep. 28, 2022 (JP) ................. 2022-155433

(51) Int. Cl.
*G07C 5/08* (2006.01)
*G06F 16/28* (2019.01)
*G07C 5/00* (2006.01)

(52) U.S. Cl.
CPC .......... *G07C 5/085* (2013.01); *G06F 16/284* (2019.01); *G07C 5/006* (2013.01); *G07C 5/008* (2013.01)

(58) Field of Classification Search
None
See application file for complete search history.

(56) References Cited

U.S. PATENT DOCUMENTS

| 2009/0118903 A1 | 5/2009 | Kimura et al. |
| 2020/0076895 A1* | 3/2020 | Tsuyunashi ............ H04N 21/40 |
| 2021/0158632 A1 | 5/2021 | Nishiyama et al. |

FOREIGN PATENT DOCUMENTS

| JP | 2009-116576 A | 5/2009 |
| JP | 2017-091234 A | 5/2017 |
| JP | 2018-055191 A | 4/2018 |
| JP | 2021-083034 A | 5/2021 |

OTHER PUBLICATIONS

Japanese Office Action Corresponding to Japanese Patent Application No. 2022155433.A, dated Jun. 4, 2024, 9 pages.

* cited by examiner

*Primary Examiner* — Abdhesh K Jha
(74) *Attorney, Agent, or Firm* — Rankin, Hill & Clark LLP

(57) ABSTRACT

An information collection system includes: a vehicle registration information acquisition unit configured to access a vehicle registration DB, and acquire vehicle registration information including an identification code and a vehicle model of the vehicles; a communication control unit configured to communicate with the vehicles; a required number setting unit configured to set a number of the vehicles required when acquiring vehicle use information of the vehicles of a specified vehicle model based on a predetermined information acquisition condition; an information acquisition target vehicle extraction unit configured to extract the required number of the vehicles from the vehicles of the specified vehicle model registered in the vehicle registration DB; and a vehicle use information acquisition unit configured to transmit vehicle use information transmission request information requesting transmission of the vehicle use information to the vehicles extracted by the information acquisition target vehicle extraction unit.

6 Claims, 3 Drawing Sheets

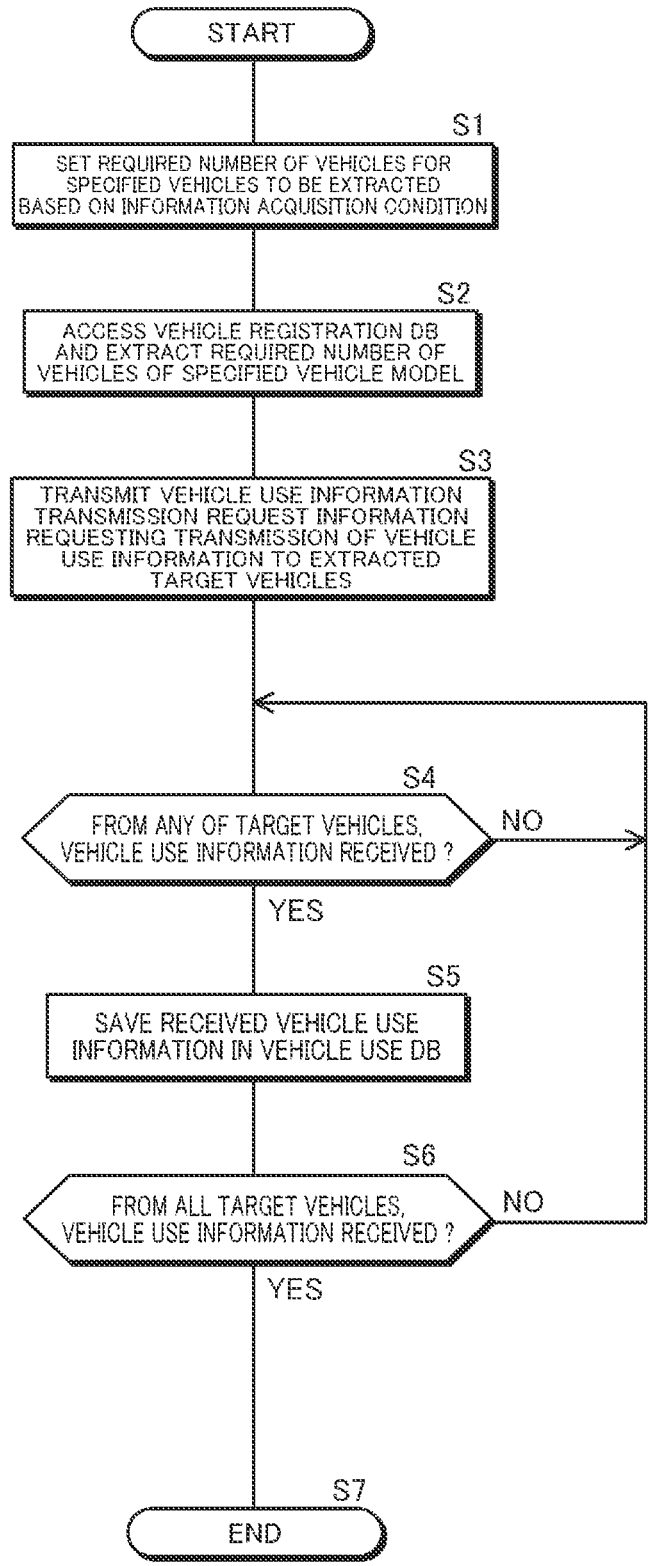

INFORMATION COLLECTION SYSTEM AND INFORMATION COLLECTION METHOD

INCORPORATION BY REFERENCE

The present application claims priority under 35 U.S.C. § 119 to Japanese Patent Application No. 2022-155433 filed on Sep. 28, 2022. The content of the application is incorporated herein by reference in its entirety.

BACKGROUND OF THE INVENTION

Field of the Invention

The present invention relates to an information collection system and an information collection method.

Description of the Related Art

Conventionally, a system which receives and collects various kinds of information transmitted from vehicles with many vehicles as targets has been known (for example, see Japanese Patent Laid-Open No. 2017-91234). The journal described above discloses a configuration which reduces a transmission amount of information as the configuration of determining presence/absence of abnormality of a program used in a vehicle controller, transmitting a diagnosis result indicating the abnormality to a system when the diagnosis result indicates the abnormality and not transmitting anything when the diagnosis result indicates normality.

In the system of the background art described above, information is transmitted from a vehicle to the system only when the abnormality occurs in the program of the vehicle, however, information of the vehicle in a state where the vehicle is normally operated is also useful information when monitoring the vehicle. Therefore, when only the information when the abnormality of the vehicle occurs is a collection target, there is a risk that vehicle operation verification and analysis become insufficient.

The present application is implemented in consideration of such a background, and it is an object to provide an information collection system and an information collection method capable of suppressing a communication amount with vehicles and efficiently collecting useful information from the vehicles.

SUMMARY OF THE INVENTION

A first aspect for achieving the object described above is an information collection system including: a vehicle registration information acquisition unit configured to access a vehicle registration database where a plurality of vehicles are registered, and acquire vehicle registration information including an identification code and a vehicle model of the vehicles registered in the vehicle registration database; a communication control unit configured to communicate with the vehicles identified by the identification code; a required number setting unit configured to set a number of the vehicles required when acquiring vehicle use information indicating a use status of the vehicles with the vehicles of a specified vehicle model as targets, based on a predetermined information acquisition condition; an information acquisition target vehicle extraction unit configured to extract the required number of the vehicles from the vehicles of the specified vehicle model registered in the vehicle registration database; and a vehicle use information acquisition unit configured to transmit vehicle use information transmission request information requesting transmission of the vehicle use information to the vehicles extracted by the information acquisition target vehicle extraction unit by the communication control unit.

The information collection system described above may be configured such that the information acquisition condition is a ratio of the required number of the vehicles to a predetermined sampling number of the vehicles, which is set for each vehicle model of the vehicles registered in the vehicle registration database.

The information collection system described above may be configured such that the vehicle use information includes at least one of a travel region of the vehicle, an air temperature when the vehicle is used, and an average travel distance of the vehicle in a predetermined measurement period.

The information collection system described above may be configured such that the vehicle registration information includes a total travel distance of the vehicles, and the information acquisition target vehicle extraction unit refers to the vehicle registration information and preferentially extracts the vehicles whose total travel distance is equal to or longer than a predetermined distance.

The information collection system described above may be configured such that the vehicle registration information includes a use region of the vehicles registered in the vehicle registration database, and the information acquisition target vehicle extraction unit refers to the vehicle registration information and preferentially extracts the vehicles whose use region is a predetermined region.

A second aspect for achieving the object described above is an information collection method executed by a computer, and the information collection method includes: a vehicle registration information acquisition step of accessing a vehicle registration database where a plurality of vehicles are registered, and acquiring vehicle registration information including an identification code and a vehicle model of the vehicles registered in the vehicle registration database; a communication control step of communicating with the vehicles identified by the identification code; a required number setting step of setting a number of the vehicles required when acquiring vehicle use information indicating a use status of the vehicles with the vehicles of a specified vehicle model as targets, based on a predetermined information acquisition condition; an information acquisition target vehicle extraction step of extracting the required number of the vehicles from the vehicles of the specified vehicle model registered in the vehicle registration database; and a vehicle use information acquisition step of transmitting vehicle use information transmission request information requesting transmission of the vehicle use information to the vehicles extracted by the information acquisition target vehicle extraction step by the communication control step.

According to the information collection system described above, useful information can be efficiently collected from vehicles while suppressing a communication amount with the vehicles.

BRIEF DESCRIPTION OF THE DRAWINGS

FIG. 3 is a flowchart of collection processing of vehicle use information.

DETAILED DESCRIPTION OF THE PREFERRED EMBODIMENTS

1. Aspect of Information Collection from Vehicles by Information Collection System With reference to FIG. 1 and FIG. 2, the aspect of information collection from a plurality of vehicles 50 executed by an information collection system 1 of the present embodiment will be explained. The information collection system 1 communicates with the plurality of vehicles 50 and a vehicle management server 100 via a communication network 200.

Figure 2:
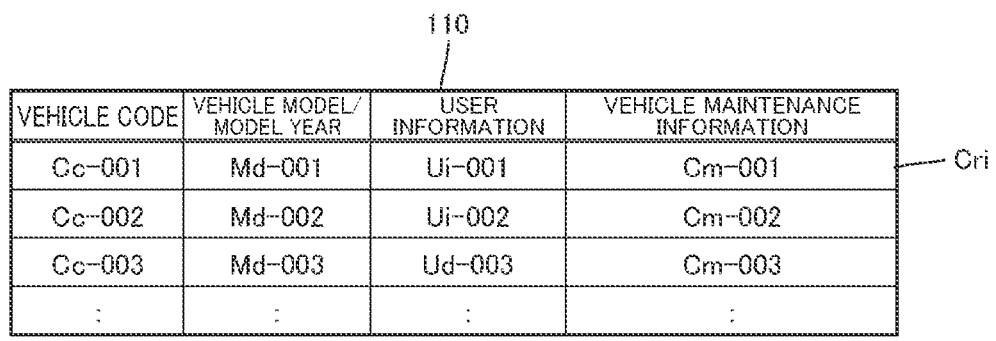
FIG. 2 is an explanatory drawing of a vehicle registration database.

The vehicle management server 100 includes a vehicle registration DB (database) 110 where each vehicle 50 is registered. As illustrated in FIG. 2, in the vehicle registration DB 110, vehicle registration information Cri including a vehicle code (Cc-001, Cc-002, . . . ), a vehicle model/model year (Md-001, Md-002, . . . ), user information (Ui-001, Ui-002, . . . ) and vehicle maintenance information (Cm-001, Cm-002, . . . ) is recorded for each vehicle 50.

The vehicle code is identification information intrinsically allocated to each vehicle 50. The user information includes a registration ID (identification), a name, an address and contact information (a telephone number and a communication address of a portable terminal or the like) or the like of a user. The vehicle maintenance information includes a history of maintenance by an automobile inspection, a periodic inspection and repair or the like of the vehicle 50 and a total travel distance or the like of the vehicle 50 confirmed at the time of the maintenance.

The vehicle 50 includes an ECU (Electronic Control Unit) 51 which controls an operation of the vehicle 50, an air conditioner 52, a battery 53, various kinds of sensors 54, a camera 55 which photographs surroundings of the vehicle 50, a communication unit 56 and a display device 57 such as a touch panel. The sensors 54 include a GNSS (Global Navigation Satellite System) sensor which detects the current position of the vehicle 50, a speed sensor, an acceleration sensor, an outside air temperature sensor, an indoor temperature sensor and a battery sensor or the like. The battery sensor detects a voltage, a current and a temperature of the battery 53.

The ECU 51 communicates with the information collection system 1 and the vehicle management server 100 via the communication network 200 by the communication unit 56. In addition, the information collection system 1 and the vehicle management server 100 communicate with a user terminal 60 (a smartphone, a portable phone and a tablet terminal or the like) used by a user U riding in the vehicle 50 via the communication network 200.

The information collection system 1 sets a required number of the vehicles 50 of a specified vehicle model to be an acquisition target of vehicle use information Cui indicating a use status of the vehicle 50, based on a predetermined information acquisition condition. The vehicle use information Cui includes a region where the vehicle 50 has traveled, an air temperature when the vehicle 50 is used and an average travel distance of the vehicle 50 in a predetermined measurement period (for example, one month), which are detected by the sensors 54 in the vehicle 50.

The information collection system 1 refers to the vehicle registration DB 110, extracts the required number of the vehicles 50 of the specified vehicle model, and transmits vehicle use information transmission request information Cur requesting transmission of the vehicle use information Cui to the extracted vehicles 50. Then, the information collection system 1 receives and acquires the vehicle use information Cui transmitted from the extracted vehicles 50.

In such a manner, by limiting the vehicles 50 to be the acquisition target of the vehicle use information Cui to the required number of the vehicles 50 of the specified vehicle model satisfying the information acquisition condition, a communication amount between the information collection system 1 and the plurality of vehicles 50 can be reduced and the vehicle use information Cui can be efficiently collected.

Further, the vehicle use information Cui includes information on operation statuses of on-board devices such as the ECU 51 and the air conditioner 52 and a speed and acceleration or the like detected by the sensors 54. Then, the information which changes every minute according to the use status of the vehicle 50 is continuously and repeatedly transmitted from the vehicle 50 to the information collection system 1 by a predetermined sampling cycle identified by the vehicle use information transmission request information Cur or according to the vehicle use information transmission request information Cur transmitted in the predetermined sampling cycle, and is utilized for various kinds of vehicle state analysis of a target vehicle model.

2. Configuration of Information Collection System

Figure 1:
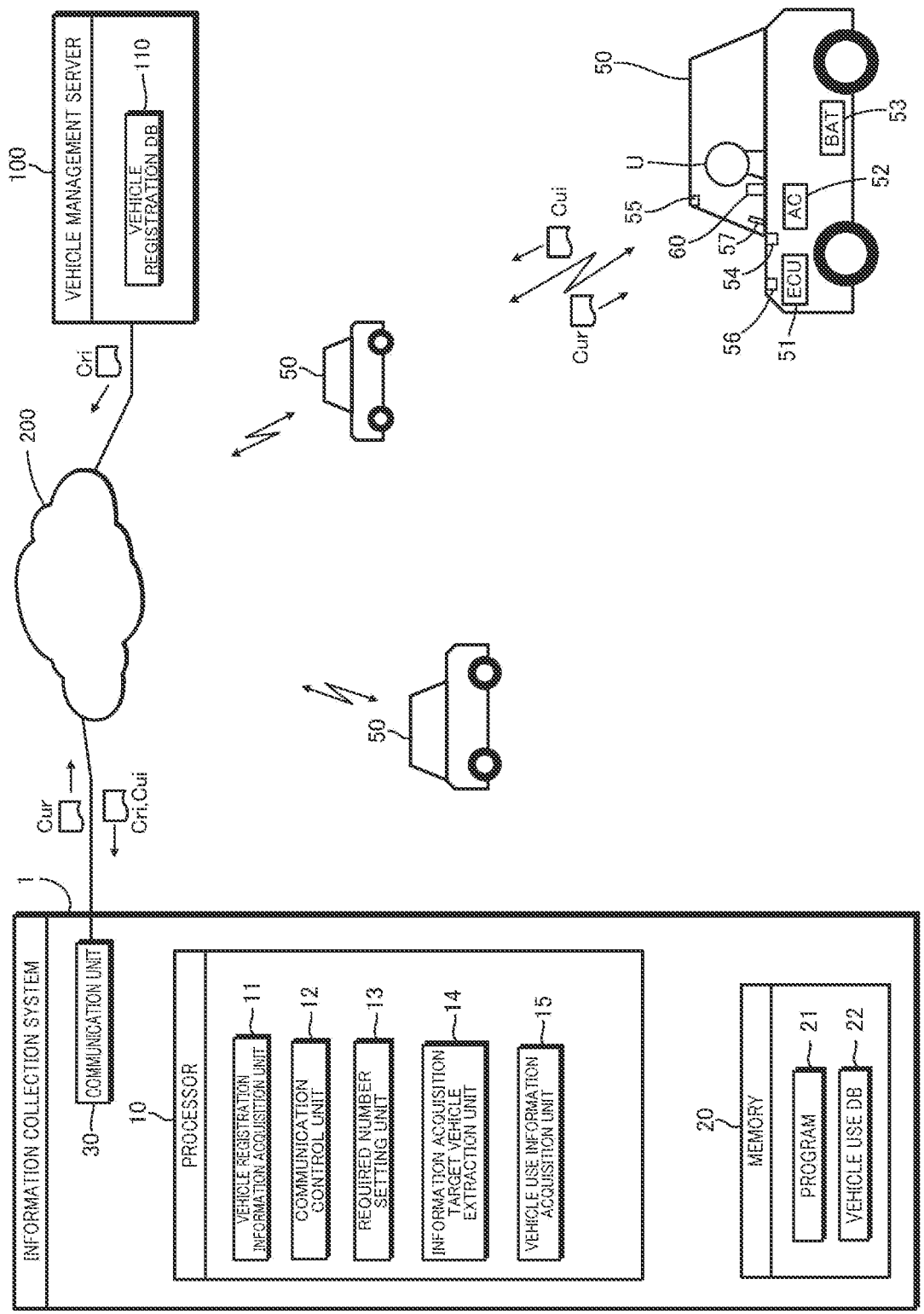
FIG. 1 is an explanatory drawing of a configuration of an information collection system and an aspect of information collection from vehicles by the information collection system.

With reference to FIG. 1, the configuration of the information collection system 1 will be explained. The information collection system 1 is a computer system including a processor 10, a memory 20, and a communication unit 30 or the like. The communication unit 30 communicates with the vehicle management server 100, each vehicle 50 and the user terminal 60 via the communication network 200.

In the memory 20, a program 21 for control of the information collection system 1 and a vehicle use DB 22 where the vehicle use information Cui acquired from the vehicle 50 is recorded are saved. The processor 10 functions as a vehicle registration information acquisition unit 11, a communication control unit 12, a required number setting unit 13, an information acquisition target vehicle extraction unit 14, and a vehicle use information acquisition unit 15, by reading and executing the program 21.

Processing executed by the vehicle registration information acquisition unit 11 corresponds to a vehicle registration information acquisition step in an information collection method of the present disclosure, and processing executed by the communication control unit 12 corresponds to a communication control step in the information collection method of the present disclosure. Processing executed by the required number setting unit 13 corresponds to a required number setting step of the present disclosure, and processing executed by the information acquisition target vehicle extraction unit 14 corresponds to an information acquisition target vehicle extraction step of the present disclosure. Processing executed by the vehicle use information acquisition unit 15 corresponds to a vehicle use information acquisition step of the present disclosure.

The vehicle registration information acquisition unit 11 refers to the vehicle registration DB 110 and acquires the vehicle registration information Cri of the vehicle 50 by accessing the vehicle management server 100 via the communication network 200 by the communication unit 30. The communication control unit 12 controls communication via the communication network 200 by the communication unit 30 with the vehicle 50 identified by the identification code obtained from the vehicle registration information Cri.

The required number setting unit 13 sets the required number of the vehicles for the specified vehicle model to be the acquisition target of the vehicle use information Cui, based on the predetermined information acquisition condition. The information acquisition condition is set by a ratio of the required number of the vehicles to a sampling number of vehicles as follows, for a vehicle model A, a vehicle model B and a vehicle model C in the following situations, for example.

The vehicle model A . . . It is a new vehicle model and the number of sales is small.

The vehicle model B . . . It is a popular vehicle model and the number of sales is large.

The vehicle model C . . . It is a popular vehicle model and a failure has been detected in some vehicles.

The information acquisition condition for the vehicle model A . . . Since it is demanded to acquire the vehicle use information from a certain number of the vehicles 50 until the vehicle model becomes popular, a data acquisition ratio is set at 100%. For example, when 500 is set as the sampling number of the vehicles for the number of sales of 100,000, the required number setting unit 13 sets 500×100%=500 as the required number of the vehicles.

The information acquisition condition for the vehicle model B . . . Since the vehicle model has become popular with a large number of sales and needs for analyzing the vehicle use information are low, the data acquisition ratio is set at 20%. For example, when 500 is set as the sampling number of the vehicles for the number of sales of 100,000, the required number setting unit 13 sets 500×20%=100 as the required number of the vehicles.

The information acquisition condition for the vehicle model C . . . Since the failure has been detected though it is a popular vehicle model, the needs for analyzing the vehicle use information have increased, however, the needs for analyzing the vehicle use information gradually become low as coping with the failure advances. Therefore, the data acquisition ratio is set so as to become low stepwise like 100%→50%→20% with lapse of time. For example, when 500 is set as the sampling number of the vehicles for the number of sales of 100,000, the required number setting unit 13 gradually reduces and sets the required number of the vehicles like 500×100%=500→500×50%=250→500×20%=100 with lapse of time.

The information acquisition target vehicle extraction unit 14 refers to the vehicle registration DB 110 and extracts the vehicles 50 of the specified vehicle model for the required number set by the required number setting unit 13. In this case, the information acquisition target vehicle extraction unit 14 may preferentially extract the vehicles 50 satisfying one of the following preferential extraction conditions 1-3.

The preferential extraction condition 1 . . . The total travel distance of the vehicle 50 is equal to or longer than a predetermined distance. The total travel distance of the vehicle 50 can be recognized from the vehicle maintenance information (see FIG. 2) of the vehicle registration information Cri. Alternatively, the total travel distance can be recognized from the latest vehicle use information Cui transmitted from the vehicle 50.

The preferential extraction condition 2 . . . The region where the vehicle 50 is used is a cold region. The region where the vehicle 50 is used can be recognized from the user information (see FIG. 2) of the vehicle registration information Cri. Alternatively, the region can be recognized from the past vehicle use information Cui transmitted from the vehicle 50.

The preferential extraction condition 3 . . . A travel frequency (use frequency) of the vehicle 50 is a predetermined level or higher. The travel frequency (use frequency) of the vehicle 50 can be recognized from the travel distance of the vehicle 50 per predetermined period recognized from the vehicle maintenance information (see FIG. 2) of the vehicle registration information Cri. Alternatively, the travel frequency (use frequency) can be recognized from the past vehicle use information Cui transmitted from the vehicle 50.

The vehicle use information acquisition unit 15 transmits the vehicle use information transmission request information Cur requesting the transmission of the vehicle use information Cui to the vehicles 50 (called target vehicles 50, hereinafter) extracted by the information acquisition target vehicle extraction unit 14 via the communication network 200 by the communication control unit 12 and the communication unit 30.

The vehicle use information acquisition unit 15 receives and acquires the vehicle use information Cui transmitted from the target vehicles 50 which have received the vehicle use information transmission request information Cur via the communication network 200 by the communication control unit 12 and the communication unit 30, and records the acquired vehicle use information Cui in the vehicle use DB 22. The vehicle use information Cui recorded in the vehicle use DB 22 is used for various kinds of analysis for each vehicle model.

3. Collection Processing of Vehicle Use Information

According to a flowchart illustrated in FIG. 3, a series of procedures of the collection processing of the vehicle use information Cui executed by the information collection system 1 will be explained.

In step S1 in FIG. 3, the required number setting unit 13 sets the required number of the vehicles 50 of the specified vehicle model to be extracted based on the information acquisition condition described above. In following step S2, the information acquisition target vehicle extraction unit 14 accesses the vehicle registration DB 110 in the vehicle management server 100 and extracts the required number of the vehicles 50 of the specified vehicle model in consideration of the preferential extraction conditions 1-3 described above.

In next step S3, the vehicle use information acquisition unit 15 transmits the vehicle use information transmission request information Cur to the target vehicles 50 extracted by the information acquisition target vehicle extraction unit 14. In following step S4, the vehicle use information acquisition unit 15 advances the processing to step S5 when the vehicle use information Cui is received from one of the target vehicles 50. In step S5, the vehicle use information acquisition unit 15 saves the received vehicle use information Cui in the vehicle use DB 22.

In next step S6, the vehicle use information acquisition unit 15 determines whether or not the vehicle use information Cui is received from all the target vehicles 50. Then, when the vehicle use information Cui is received from all the target vehicles 50, the vehicle use information acquisition unit 15 advances the processing to step S7 and ends the collection processing of the vehicle use information by the flowchart in FIG. 3. On the other hand, when the target vehicles 50 from which the vehicle use information Cui is not received yet still remain, the vehicle use information acquisition unit 15 advances the processing to step S4.

By the collection processing of the vehicle use information by the flowchart in FIG. 3, the vehicle use information Cui of the required number of the vehicles 50 of the specified vehicle model is acquired, and the specified vehicle model can be analyzed using the acquired vehicle use information Cui.

4. Other Embodiments

In the embodiment described above, the required number setting unit 13 uses the ratio of the required number of the vehicles to the sampling number of the vehicles as the information acquisition condition, however, other information acquisition conditions may be used. For example, the required number of the vehicles of the specified vehicle model to be the acquisition target of the vehicle use information Cui may be set using the information acquisition conditions by (1)-(3) below.

(1) The required number setting unit 13 sets the required number of the vehicles as follows according to a range of the number of the vehicles of each vehicle model registered in the vehicle registration DB 110.

The number of the registered vehicles is 100 or smaller . . . The required number of the vehicles is set at the total number of the registered vehicles.

The number of the registered vehicles is 101-1,000 . . . The required number of the vehicles is set at 100.

The number of the registered vehicles is 1,001-10,000 . . . The required number of the vehicles is set at 200.

The number of the registered vehicles is 10,001-100,001 . . . The required number of the vehicles is set at 400.

(2) A table in which the required number of the vehicles is set is prepared for each vehicle model registered in the vehicle registration DB 110, and the required number setting unit 13 refers to the table and sets the required number of the vehicles. Specifications of the table can be updated by a manager at an analysis center or the like who analyzes the acquired information.

(3) A function which outputs the required number of the vehicles for input of the number of the registered vehicles is prepared for each vehicle model registered in the vehicle registration DB 110, and the required number setting unit 13 sets the required number of the vehicles using the function.

In the embodiment described above, the information acquisition target vehicle extraction unit 14 preferentially extracts the target vehicles 50 satisfying the preferential extraction conditions 1-3 described above, however, the target vehicles 50 may be extracted without setting such preferential extraction conditions.

The embodiment described above illustrates an example that the vehicle use information Cui includes a travel region of the vehicle 50, the air temperature when the vehicle 50 is used and the average travel distance of the vehicle 50 in the predetermined measurement period. As another embodiment, the vehicle use information Cui may include any one or two of the travel regions of the vehicle 50, the air temperature when the vehicle 50 is used and the average travel distance of the vehicle 50 in the predetermined measurement period. In addition, the vehicle use information Cui may include other information such as a type of a road (a general road or a highway or the like) where the vehicle 50 has traveled, a future travel schedule of the vehicle 50, a travel speed of the vehicle 50 and acceleration/deceleration of the vehicle 50.

The embodiment described above illustrates an example that the vehicle registration DB 110 is provided in the vehicle management server 100, however, the vehicle registration DB 110 may be provided in the memory 20 of the information collection system 1.

Note that FIG. 1 is a schematic drawing in which a functional configuration of the information collection system 1 is segmented according to main processing contents and illustrated in order to facilitate understanding of the invention of the present disclosure, and the configuration of the information collection system 1 may be made with other segmentations. In addition, the processing of each component may be executed by one hardware unit or may be executed by a plurality of hardware units. Further, the processing of each component illustrated in FIG. 3 may be executed by one program or may be executed by a plurality of programs.

5. Configurations Supported by Embodiment Described Above

The embodiment described above is a specific example of the following configurations.

(Configuration 1) An information collection system including: a vehicle registration information acquisition unit configured to access a vehicle registration database where a plurality of vehicles are registered, and acquire vehicle registration information including an identification code and a vehicle model of the vehicles registered in the vehicle registration database; a communication control unit configured to communicate with the vehicles identified by the identification code; a required number setting unit configured to set a number of the vehicles required when acquiring vehicle use information indicating a use status of the vehicles with the vehicles of a specified vehicle model as targets, based on a predetermined information acquisition condition; an information acquisition target vehicle extraction unit configured to extract the required number of the vehicles from the vehicles of the specified vehicle model registered in the vehicle registration database; and a vehicle use information acquisition unit configured to transmit vehicle use information transmission request information requesting transmission of the vehicle use information to the vehicles extracted by the information acquisition target vehicle extraction unit by the communication control unit.

According to the information collection system of configuration 1, useful information can be efficiently collected from the vehicles while suppressing the communication amount with the vehicles.

(Configuration 2) The information collection system according to configuration 1, wherein the information acquisition condition is a ratio of the required number of the vehicles to a predetermined sampling number of the vehicles, which is set for each vehicle model of the vehicles registered in the vehicle registration database.

According to the information collection system of configuration 2, the number of the vehicles to be information collection targets can be easily set based on the required number of pieces of the vehicle use information, which is different for each vehicle model.

(Configuration 3) The information collection system according to configuration 1 or configuration 2, wherein the vehicle use information includes at least one of a travel region of the vehicle, an air temperature when the vehicle is used, and an average travel distance of the vehicle in a predetermined measurement period.

According to the information collection system of configuration 3, the travel region of the vehicle, the air temperature when the vehicle is used and the average travel distance of the vehicle in the predetermined measurement period, which are utilizable for analyzing factors of failures and degradation or the like of the vehicle, can be acquired while suppressing the communication amount.

(Configuration 4) The information collection system according to any one of configuration 1-configuration 3, wherein the vehicle registration information includes a total travel distance of the vehicles, and the information acquisition target vehicle extraction unit refers to the vehicle registration information and preferentially extracts the vehicles whose total travel distance is equal to or longer than a predetermined distance.

According to the information collection system of configuration 4, by preferentially extracting the vehicle whose total travel distance is equal to or longer than the predetermined distance and which is estimated to have a high possibility that the degradation of the vehicle has advanced and the failure is to occur, information regarding the failure can be collected in an early stage.

(Configuration 5) The information collection system according to any one of configuration 1-configuration 4, wherein the vehicle registration information includes a use region of the vehicles registered in the vehicle registration database, and the information acquisition target vehicle extraction unit refers to the vehicle registration information and preferentially extracts the vehicles whose use region is a predetermined region.

According to the information collection system of configuration 5, for example, by preferentially extracting the vehicle estimated to have the high possibility that the failure is to occur due to a reason that the vehicle is used in the cold region and the use frequency of the air conditioner is high or the like, the information regarding the failure can be collected in the early stage.

(Configuration 6) An information collection method executed by a computer, the information collection method including: a vehicle registration information acquisition step of accessing a vehicle registration database where a plurality of vehicles are registered, and acquiring vehicle registration information including an identification code and a vehicle model of the vehicles registered in the vehicle registration database; a communication control step of communicating with the vehicles identified by the identification code; a required number setting step of setting a number of the vehicles required when acquiring vehicle use information indicating a use status of the vehicles with the vehicles of a specified vehicle model as targets, based on a predetermined information acquisition condition; an information acquisition target vehicle extraction step of extracting the required number of the vehicles from the vehicles of the specified vehicle model registered in the vehicle registration database; and a vehicle use information acquisition step of transmitting vehicle use information transmission request information requesting transmission of the vehicle use information to the vehicles extracted by the information acquisition target vehicle extraction step by the communication control step.

By executing the information collection method of configuration 6 by the computer, effects similar to that of the information collection system of configuration 1 can be obtained.

REFERENCE SIGNS LIST

1 . . . information collection system, 10 . . . processor, 11 . . . vehicle registration information acquisition unit, 12 . . . communication control unit, 13 . . . required number setting unit, 14 . . . information acquisition target vehicle extraction unit, 15 . . . vehicle use information acquisition unit, 20 . . . memory, 21 . . . program, 22 . . . vehicle use DB, 30 . . . communication unit, 50 . . . vehicle, 51 . . . ECU, 52 . . . air conditioner, 53 . . . battery, 54 . . . sensors, 55 . . . camera, 56 . . . communication unit, 57 . . . display device, 60 . . . user terminal, 100 . . . vehicle management server, 110 . . . vehicle registration DB, 200 . . . communication network, U . . . user.

What is claimed is:

1. An information collection system comprising a processor configured to:
   access a vehicle registration database where a plurality of vehicles are registered, and acquire vehicle registration information including an identification code and a vehicle model of the vehicles registered in the vehicle registration database;
   communicate with the vehicles identified by the identification code;
   set a number of the vehicles required when acquiring vehicle use information indicating a use status of the vehicles with the vehicles of a specified vehicle model as targets, based on a predetermined information acquisition condition;
   extract the required number of the vehicles from the vehicles of the specified vehicle model registered in the vehicle registration database; and
   transmit vehicle use information transmission request information requesting transmission of the vehicle use information to the vehicles that are extracted,
   wherein the information acquisition condition is a ratio of the required number of the vehicles to a predetermined sampling number of the vehicles, the required number of the vehicles in the ratio being set lower as a number of sales increases, and the ratio being set for each vehicle model of the vehicles registered in the vehicle registration database.

2. The information collection system according to claim 1,
   wherein the vehicle use information includes at least one of a travel region of the vehicle, an air temperature when the vehicle is used, and an average travel distance of the vehicle in a predetermined measurement period.

3. The information collection system according to claim 1,
   wherein the vehicle registration information includes a total travel distance of the vehicles, and
   the processor refers to the vehicle registration information and extracts the vehicles whose total travel distance is equal to or longer than a predetermined distance.

4. The information collection system according to claim 1,
   wherein the vehicle registration information includes a use region of the vehicles registered in the vehicle registration database, and
   the processor refers to the vehicle registration information and extracts the vehicles whose use region is a predetermined region.

5. An information collection method executed by a computer, the information collection method comprising:
- a vehicle registration information acquisition step of accessing a vehicle registration database where a plurality of vehicles are registered, and acquiring vehicle registration information including an identification code and a vehicle model of the vehicles registered in the vehicle registration database;
- a communication control step of communicating with the vehicles identified by the identification code;
- a required number setting step of setting a number of the vehicles required when acquiring vehicle use information indicating a use status of the vehicles with the vehicles of a specified vehicle model as targets, based on a predetermined information acquisition condition;
- an information acquisition target vehicle extraction step of extracting the required number of the vehicles from the vehicles of the specified vehicle model registered in the vehicle registration database; and
- a vehicle use information acquisition step of transmitting vehicle use information transmission request information requesting transmission of the vehicle use information to the vehicles extracted by the information acquisition target vehicle extraction step by the communication control step, wherein
- the information acquisition condition is a ratio of the required number of the vehicles to a predetermined sampling number of the vehicles, the required number of the vehicles in the ratio being set lower as a number of sales increases, and the ratio being set for each vehicle model of the vehicles registered in the vehicle registration database.

6. An information collection system comprising a processor configured to:
- access a vehicle registration database where a plurality of vehicles are registered, and acquire vehicle registration information including an identification code and a vehicle model of the vehicles registered in the vehicle registration database;
- communicate with the vehicles identified by the identification code;
- set a number of the vehicles required when acquiring vehicle use information indicating a use status of the vehicles with the vehicles of a specified vehicle model as targets, based on a predetermined information acquisition condition;
- extract the required number of the vehicles from the vehicles of the specified vehicle model registered in the vehicle registration database; and
- transmit vehicle use information transmission request information requesting transmission of the vehicle use information to the vehicles extracted,
- wherein the information acquisition condition is a ratio of the required number of the vehicles to a predetermined sampling number of the vehicles, the required number of the vehicles in the ratio being set to be gradually reduced according to a lapse of time from a time when a failure has been detected, and the ratio being set for each vehicle model of the vehicles registered in the vehicle registration database.

* * * * *